United States Patent [19]

Castro

[11] Patent Number: 4,904,881
[45] Date of Patent: Feb. 27, 1990

[54] EXCLUSIVE-OR CELL FOR NEURAL NETWORK AND THE LIKE

[75] Inventor: Hernan A. Castro, Shingle Springs, Calif.

[73] Assignee: Intel Corporation, Santa Clara, Calif.

[21] Appl. No.: 309,247

[22] Filed: Feb. 10, 1989

[51] Int. Cl.[4] .......................................... H03K 19/21
[52] U.S. Cl. .................................... 307/201; 307/464; 307/468; 307/471; 307/529; 364/807
[58] Field of Search ............... 307/201, 450, 464–465, 307/468–469, 471, 490, 501, 529; 364/513, 807; 365/184–185

[56] References Cited

U.S. PATENT DOCUMENTS

| | | | |
|---|---|---|---|
| 3,546,601 | 12/1970 | Hiltz ................................. | 307/201 X |
| 4,027,175 | 5/1977 | Hurst .................................. | 307/464 |
| 4,055,773 | 10/1977 | Schoett .......................... | 307/464 X |
| 4,202,044 | 5/1980 | Beilstein, Jr. et al. .......... | 307/529 X |
| 4,453,096 | 6/1984 | LeCan et al. ................... | 307/471 X |
| 4,617,479 | 10/1986 | Hartmann et al. ................. | 307/465 |
| 4,660,166 | 4/1987 | Hopfield .............................. | 364/807 |
| 4,695,979 | 9/1985 | Tuvell et al. ........................ | 365/185 |
| 4,760,437 | 7/1988 | Denker et al. ........................ | 357/30 |
| 4,773,024 | 9/1988 | Faggin et al. ....................... | 364/513 |
| 4,782,460 | 11/1988 | Spencer .............................. | 364/807 |
| 4,797,625 | 1/1989 | Nakazawa ...................... | 307/471 X |
| 4,802,103 | 1/1989 | Faggin et al. ....................... | 364/513 |
| 4,807,168 | 2/1989 | Moopenn et al. .................... | 364/807 |

OTHER PUBLICATIONS

Clark et al., "A Pipelined Associative Memory Implemented in VLSI", IEEE Journal of Solid-State Circuits, vol. 24, No. 1, pp. 28–34, Feb. 1989.

*Primary Examiner*—David Hudspeth
*Attorney, Agent, or Firm*—Blakely, Sokoloff, Taylor & Zafman

[57] ABSTRACT

A semiconductor cell for producing an output current that is related to the match between an input vector pattern and a weighting pattern is described. The cell is particularly useful as a synapse cell within a neural network to perform pattern recognition tasks. The cell includes a pair of input lines for receiving a differential input vector element value and a pair of output lines for providing a difference current to a current summing neural amplifier. A plurality of floating gate devices each having a floating gate member are employed in the synapse cell to store charge in accordance with a predetermined weight pattern. Each of the floating gate devices is uniquely coupled to a combination of an output current line and an input voltage line such that the difference current provided to the neural amplifier is related to the match between the input vector and the stored weight.

14 Claims, 2 Drawing Sheets

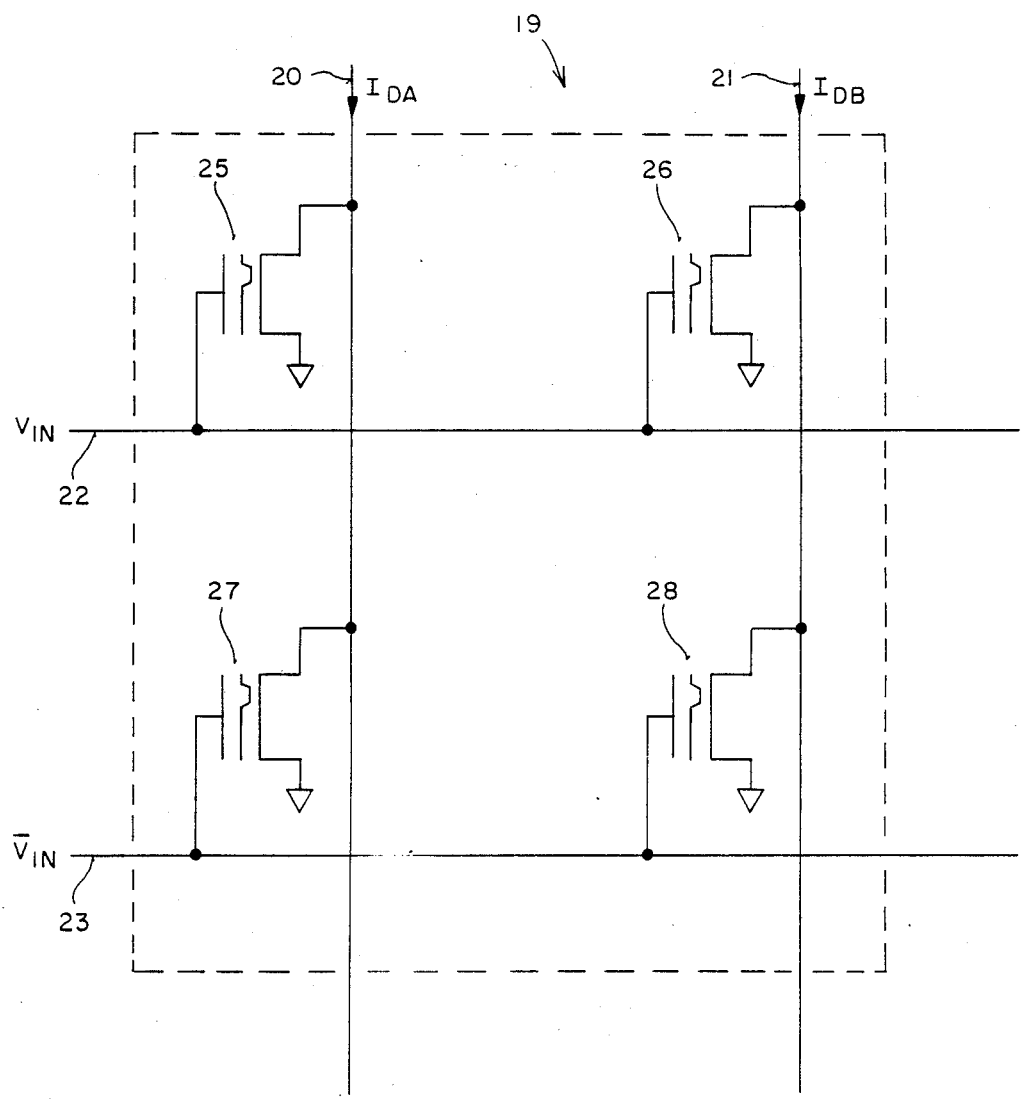
FIG_1

FIG_2
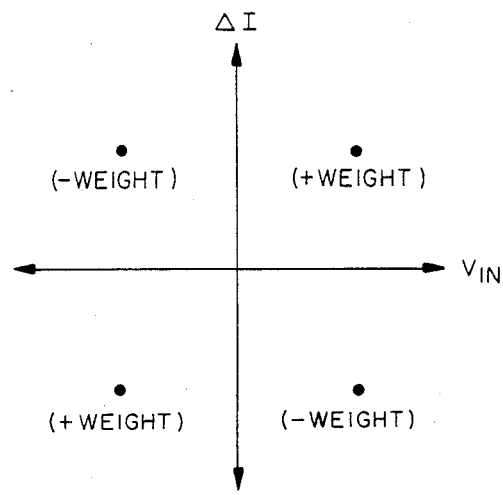
$\Delta I = I_{DA} - I_{DB} \sim \text{WEIGHT} * V_{IN}$
FIG_3
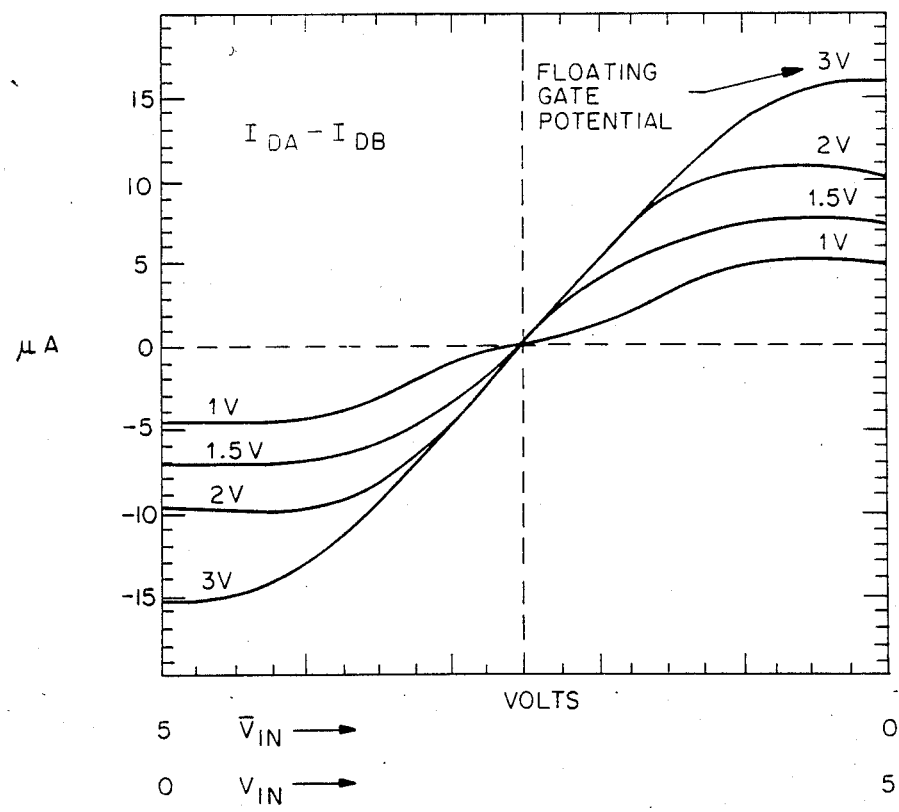

4,904,881

EXCLUSIVE-OR CELL FOR NEURAL NETWORK AND THE LIKE

FIELD OF THE INVENTION

The invention relates to the field of semiconductor cells, particularly those cells having application in neural networks.

BACKGROUND OF THE INVENTION

The search for new approaches to parallel computing and advanced data storage and retrieval have generated a great deal of interest in neural networks. In general, neural networks attempt to duplicate the logic performed by the human brain and the brains of other animals. The circuit models that have been proposed for both learning (e.g., a programming mode) and decision-making (e.g., recognition, associative memory, etc.). For a broad discussion of neural networks, see "A Neuralmorphic VLSI Learning System", by Alspector and Allan, Advanced Research in VLSI, *Proceedings of a 1987 Stanford Conference.*

FIG. 6 of the Alspector paper shows a typical neuron or cell. A neuron includes dendrites (inputs), synapses (connections), neuron body (summing amplifier) and axon (output). Often, the synapses for these cells are implemented by using digital registers and digital-to-analog convertors to provide a weighting factor or function. Other circuit means are provided to multiply the input signal by this weighting factor. An example of such a synapse is found in co-pending application entitled "Semiconductor Cell For Neural Network Employing A Four-Quadrant Multiplier", Serial No. 283,553, Filing Date is 12/09/88, assigned to the assignee of the present invention. The weighting factor associated with a given synapse represents a connection strength within the neural network.

One category of tasks that neural networks are useful in performing recognition tasks, i.e., analyzing data and identifying which features are present. This involves matching templates and expected features to the data and finding the best fit or a list of good fits. In pattern matching problems the same stored patterns are repeatedly compared to different input patterns using the same calculation. One measure of the difference between two given binary patterns is the "Hamming distance". A binary pattern or binary vector is defined here to be a string of 1's and 0's (bits) in which the sequence of the bits is meaningful. Mathematically, the Hamming distance between two patterns is the number of the bits which are different in the two patterns in corresponding positions. Both patterns must have the same number of bits for the Hamming distance to have meaning. The Hamming distance calculation is logically identical to EXCLUSIVE-ORing bits in corresponding positions in the binary patterns and summing the results.

While there have been numerous proposed semiconductor cells for implementing synapses capable of multiplication and non-volatile data storage and other cells capable of performing the EXCLUSIVE-OR function and volatile data storage in amplifier neural networks (See Clark et al., "A Pipelined Associative Memory Implemented in VLSI", IEEE Journal of Solid-State Circuits, Vol. 24, No. 1, pp. 28–34, February 1989), applicant is unaware of any proposed devices capable of performing the EXCLUSIVE-OR function and non-volatile data storage. As will be seen, the present invention discloses a semiconductor cell which is capable of performing the EXCLUSIVE-OR function and non-volatile storage of a single bit of information. This cell is useful in performing Hamming distance calculations useful for pattern recognition tasks.

SUMMARY OF THE INVENTION

A electrically alterable, non-volatile semiconductor cell for producing an output current that is proportional to the match between an input vector pattern and a stored weighting pattern is described. The cell is particularly useful as, but is not limited to, a synapse cell in a neural network to perform pattern recognition tasks. The cell includes a pair of input lines for receiving a differential input vector value and a pair of output lines for providing a difference current to a current summing neural amplifier.

A plurality of floating gate devices each having a floating gate member are employed in the synapse cell to store charge in accordance with a predetermined weight pattern. Each of the floating gate devices is uniquely coupled to a combination of an output current life and an input voltage line; the control gate of the floating gate devices being coupled to one input voltage line and the drain of the device being coupled to one output current line. The floating gate devices are arranged in such a way that the difference current provided across the output lines is directly related to the match between the input vector and the stored vector represented by the pattern of floating gate charges.

The cell described in the present application is also useful as an analog multiplier. As an analog multiplier, the input vector pattern and stored weight pattern may assume analog rather than digital values. When used this way, the output current difference is approximately equal to the product of the stored weight and the input vector value.

BRIEF DESCRIPTION OF THE DRAWINGS

The present invention will be understood more fully from the detailed description given below and from the accompanying drawings of the preferred embodiment of the present invention, which, however, should not be taken to limit the invention to the specific embodiment but are for explanation and understanding only.

FIG. 1 illustrates the currently preferred embodiment of the present invention.

FIG. 2 illustrates the difference current versus input voltage characteristics of the present invention for a binary input vector and a digitally stored weight.

FIG. 3 shows the difference current versus difference input voltage for various programmed floating gate potentials. This figure illustrates how the present invention may be used as an analog multiplier within a neural network.

DETAILED DESCRIPTION OF THE PRESENT INVENTION

A semiconductor cell employing floating gate memory devices which is particularly suited for neural networks and the like is described. In the following description, numerous specific details are set forth, such as specific conductivity types, etc., in order to provide a more thorough understanding of the present invention. It will be obvious, however, to one skilled in the art that these specific details need not be used to practice the present invention. In other instances, other well-known structures and circuits have not been shown in detail in order to avoid unnecessarily obscuring the present invention.

Typically, in a neural network, inputs (e.g., stimuli) are coupled via resistors to the input terminals of current summing amplifiers. The output of each of these amplifiers provides signals that may be coupled—via a second set of resistors—to the inputs of another set of current summing amplifiers in the next layer of the neural network. Input signals provide contributions to the output signals through resistors which are analogous to the synapses in biological neurons. Thus, an input voltage vector contributes a current to the input of the neural amplifiers through a set of resistors or synapses. In the simplest neural networks, the resistors are either short circuits or open circuits, or they may have a discrete value. In those neural networks used for learning, decision-making and pattern recognition, the resistors are assigned a binary weight value corresponding to the strength of the synapse connection.

Referring to Fig. 1, a currently preferred embodiment of the present invention is shown which is useful as a synapse cell. When used for this application, semiconductor cell 19 couples an input vector, $V_{IN}$, to a set of current summing neural amplifiers within a network. The connection to the neural amplifiers is made differentially along lines 20 and 21. The input vector, $V_{IN}$, and its compliment, $\overline{V}_{IN}$, are provided on lines 22 and 23, respectively.

As can be seen in FIG. 1, the present invention makes use of a plurality of well-known prior art memory cells which have members that are electrically charged. These are shown in FIG. 1 as floating gate devices 25-28. Most often, these devices employ polysilicon floating gates which are completely surrounded by insulation (e.g., silicon dioxide). Charge is transferred onto these floating gates through a variety of mechanisms such as avalanche injection, channel injection, tunneling, etc. The charge on the floating gate affects the conductivity in the device. If the conductivity is above a certain level, the device is deemed to be programmed in one binary state. If the conductivity is below another level, it is deemed to be programmed in the other binary state. For analog applications the floating gate charge is controlled to provide intermediate levels of conductivity between the upper and lower limits.

These memory devices take a variety of forms in the prior art, some being both electrically erasable and electrically programmable and others requiring for example, ultraviolet light for erasing. The devices are incorporated in memories referred to in the prior art as EPROMS, EEPROMS or flash EEPROMS. The currently preferred embodiment of the present invention employs EEPROM devices to control the current flowing along lines 20 and 21. EEPROMS are particularly well-suited for applications which require low current consumption. Alternatively, where die size is the paramount concern EPROM devices may be used as substitutes.

Referring again to FIG. 1, cell 19 shows floating gate device 25 having its drain coupled to output current line 20 and its source grounded. The control gate of floating gate device 25 is coupled to the $V_{IN}$ input along line 22. Similarly, device 26 has its drain coupled to line 21, its source grounded and its control gate coupled to line 22. Floating gate device 27 has its drain coupled to line 20, its source grounded and its control gate coupled to line 23. To complete cell 19, floating gate device 28 has its drain coupled to line 21, its source grounded and its control gate coupled to line 23. Line 23, of course, is coupled to the $\overline{V}_{IN}$ input. As will be discussed in more detail later, each of the floating gate devices of semiconductor cell 19 are used to store a weight pattern—the pattern being stored on the floating gate members of the array of devices—which may be either digital or analog in nature.

Recharging and discharging of the floating gate members may occur in a manner well-known in the prior art. For example, to program device 25 line 20 (connected to the drain region of device 25) is grounded while line 22 (connected to the control device of line 25) is raised to a high positive potential. A high positive voltage on the control gate of device 25 causes electrons to tunnel through the thin oxide near its drain and be captured by the floating gate, raising its (programming) threshold. Electrons are removed from the floating gate of device 25 by taking the control gate of device 25 connected to line 22 to a voltage at or near ground potential. The drain of device 25 is then taken to high voltage by raising the potential on line 20. The source either floats or remains grounded. This application of a high bias to the drain of device 25, while its control gate is grounded, causes electrons to tunnel from the floating gate to the drain—thereby reducing the (erasing) threshold of device 25. In a manner similar to that just described, floating gate devices 26, 27 and 28 may also be programmed or erased by either raising or lowering the potential on lines 22, 23, 20 and 21 in accordance with the description given above.

A weight pattern is stored into semiconductor cell 19 by programming, (i.e., charging) certain floating gate devices to a predetermined level while erasing, (i.e., removing charge) other devices. By way of example, a digital weight pattern of "+1" may be stored in cell 19 by erasing the floating gate members of floating gate devices 25 and 28 while, at the same time, programming devices 26 and 27. Conversely, a weight of "−1" is stored in cell 19 by erasing devices 26 and 27 and programming devices 25 and 28. An illustration of such a programming pattern is provided in Table 1, in which letters "E" and "P" denote a device that is either erased or programmed, respectively.

TABLE 1

| Weight Value | Programming Pattern | |
| --- | --- | --- |
| +1 | $Q_{25}$ = E | $Q_{26}$ = P |
|  | $Q_{27}$ = P | $Q_{28}$ = E |
| −1 | $Q_{25}$ = P | $Q_{26}$ = E |
|  | $Q_{27}$ = E | $Q_{28}$ = P |

To better understand the operation of the present invention, consider the case in which a weight pattern of "+1" has been stored into semiconductor cell 19. Assume that a digital input vector element, $V_{IN}$, having a value corresponding to a logical "1",(e.g. 5 volts) is applied along line 22. The compliment vector element, $\overline{V}_{IN}$, having a value corresponding to a logical "0", (e.g. 0 volts) is applied along line 23. According to Table 1, a weight pattern of "+1" means that devices 25 and 28 are erased while devices 26 and 27 are programmed. Being programmed, the floating gate members of floating gate device 26 and 27 have sufficient charge residing on them so as to inhibit the formation of a conducting channel between their respective source/drain regions. This charge layer prevents current from flowing in devices 26 and 27. Consequently, devices 26 and 27 do not contribute to the currents $I_{DB}$ and $I_{DA}$, respectively.

With the application of vector element, $V_{IN}$, to the control gate of device 25, a conducting channel is formed between the source and drain regions. The current flowing through device 25 increases the read current $I_{DA}$ on line 20. Conversely, because device 26 is programmed, the application of a high potential on line 22 does not increase the current $I_{DB}$ flowing down line 21. Meanwhile, since $\overline{V}_{IN}$ has a voltage potential at or near ground potential, device 28 remains non-conductive so that it does not contribute to the current $I_{DB}$ flowing along line 21. Thus, applying an input vector value of logical "1" to semiconductor cell 19, which has been previously programmed to have a weight value of "+1", produces a positive difference current $\Delta I$ (= $I_{DA} - I_{DB}$).

Table 2 illustrates the complete range of possible combinations for a binary input vector element and a binary stored weight. Note that an input vector value $V_{IN}$="+1" corresponds to $V_{IN}$=5 volts, $\overline{V}_{IN}$=0 volts while a value of $V_{IN}$="-1" corresponds to $V_{IN}$=0 volts and $\overline{V}_{IN}$=5 volts. With reference to Table 2, when a logical "1" input vector is applied to a cell storing a "-1" weight a current difference of "-1" is produced, and so on. Table2 reveals that the present invention performs an EXCLUSIVE-OR function—calculating the vector difference between a binary input pattern and a stored binary weight pattern. The analog current difference generated at the outputs along line 20 and 21 is directly related to the strength of the match between the input vector and stored weight pattern. Thus, the Hamming distance between two patterns can be readily computed. It should be appreciated that the present invention could also be viewed as performing an EXCLUSIVE-NOR function, if, for example, a "+1" in table 2 is made to correspond to a logical "1", with "-1" corresponding to a logical "0".

TABLE 2

| Input Vector Element Value ($V_{IN}$) | Weight Value | Difference Current ($\Delta I = I_{DA} - I_{DB}$) |
|---|---|---|
| +1 | +1 | +1 |
| +1 | -1 | -1 |
| -1 | +1 | -1 |
| -1 | -1 | +1 |

FIG. 2 shows the operating characteristics of semiconductor cell 19. The blackened dots of FIG. 2 correspond to the various operating points for a binary set of stored weights and input vector values. The difference current $\Delta I$, representing $I_{DA}$ minus $I_{DB}$, is shown on the vertical axis while the horizontal axis represents the input voltage vector element. As can be seen from FIG. 2, cell 19 has four discrete operating points corresponding to each of the four possible input and weight combinations. For example, when a "+1" input vector is applied to a cell storing a "+1" weight value, a "+1" current difference results. Applying the same input to a cell storing a "-1" weight pattern produces a "-1" current difference (e.g., $I_{DB}$ greater than $I_{DA}$). With a "-1" input pattern applied, the situation is reversed. In other words, a negative stored weight produces a positive current difference while a positive weight results in a negative difference current. It should also be mentioned that even when operated digitally, the difference current is approximately equal to the product of the weight pattern (represented by the charge stored on the various floating gate members) and the vector input value.

Devices 25–28 are normally fabricated identically so that the weighting factor is impervious to fluctuations in temperature, supply, processing, etc. In the preferred embodiment of the present invention, floating gate devices 25–28 are N-channel EEPROM devices.

A weight of "0" can also be derived for cell 19 by either programming (i.e., charging) or erasing (i.e., removing charge) all of the floating gate devices. With a weight of "0", the synapse is made inactive and the difference current is zero. To produce an input vector having a value of logical "0", $V_{IN}$ is made equal to $\overline{V}_{IN}$, in which case lines 22 and 23 are both taken either high or low. When either the weight or the input vector assume a value of "0", the difference current remains zero, i.e., $I_{DA} = I_{DB}$.

Synapse cell 19 is also useful as analog multiplier. For this particular application, cell 19 receives analog rather than digital voltage inputs. Synapse cell 19 then multiplies this analog input by a stored weighting factor or function. The weighting factor or function is represented by the difference in the charge stored on the various floating gates of cell 19. The input voltage and the charge pattern in cell 19 determines the current flowing through each of the floating gate devices; thereby causing the output current difference along lines 20 and 21 to be approximately a product of the input voltage and the charge difference.

FIG. 3 shows the current transfer characteristics of cell 19 for various floating gate programming potentials. In each of the curves of FIG. 3, floating gate devices 25 and 28 are erased so that there is no charge residing on the floating gate members of those devices. With devices 25 and 28 erased, various potentials are programmed onto the floating gates of devices 26 and 27. FIG. 3 shows programming potentials of 1, 1.5, 2 and 3 volts. Obviously, the larger the programming potential, the larger the resultant current swing. Each of the curves of FIG. 3 was produced by ramping the $V_{IN}$ input from zero volts to 5 volts while simultaneously ramping its compliment $\overline{V}_{IN}$ from 5 volts to zero volts. A mirrored response, in which the difference current is initially positive and transitions negative when $V_{IN}$ ramps from "0" to "1", may be produced by reversing the programming pattern. The weight pattern is reversed by erasing devices 26 and 27 and then altering the programming voltages associated with devices 25 and 28. This has the effect of producing a current difference $I_{DA} - I_{DB}$ which is initially positive—switching negative after the input voltage $V_{IN}$ switches from zero volts to 5 volts.

Whereas many alternations and modifications of the present invention will no doubt become apparent to the person of ordinary skill in the art after having read the foregoing description, it is to be understood that the particular embodiment shown and described in way of illustration is in no way intended to be considered limiting. For example, although this disclosure has shown the use of floating gate devices for storing a weight pattern, other memory devices, such as an ordinary field-effect transistor having its gate in series with a capacitor, could also be used without detracting from the spirit or scope of the present invention. Therefore, reference to the details of the illustrated circuits are not intended to limit the scope of the claims which themselves recite only those features regarded as essential to the invention.

I claim:

1. A semiconductor cell for producing an output current which is related to the match between an input pattern and a weight pattern, said cell comprising:
   circuit means for receiving said input pattern and producing said output current, said circuit means comprising a plurality of memory devices for storing said weight pattern such that said output current is related to the match between said input pattern and said weight pattern; and
   programming means for programming said weight pattern into said circuit means.

2. The semiconductor cell of claim 1 wherein said memory devices are floating gate devices.

3. The semiconductor cell according to claim 2 wherein said input pattern is coupled to the gates of said floating gate devices and said output current is supplied to the input of a neural amplifier.

4. A semiconductor cell for use in computing the Hamming distance between a weight pattern and an input pattern, said cell comprising:
   a plurality of floating gate devices for storing said weight pattern, each of said floating gate devices having a floating gate, a drain coupled to an output and a gate coupled to said input pattern, said cell providing a current at said output which is related to the Hamming distance between said input pattern and said weight pattern; and
   means for programming said weight pattern into said floating gate devices.

5. The cell of claim 4 wherein said input pattern and said weight pattern represent binary values such that said current provided at said output corresponds to the exclusive-OR function of said input pattern and said weight pattern.

6. The cell of claim 4 wherein said current is proportional to an analog multiplication of said input pattern and said weight pattern.

7. In a neural network, a synapse cell useful in performing pattern recognition tasks comprising:
   a pair of input lines for receiving a differential input vector value;
   a pair of output lines for providing a difference current; and
   first, second, third and fourth floating gate devices, said first and said second floating gate devices having their gates coupled to one of said input lines and their drains coupled to alternate ones of said output lines, said third and fourth floating gate devices having their gates coupled to another of said input lines and their drains also coupled to alternate ones of said output lines,
   said floating gate devices storing a weight such that said difference current provided across said pair of output lines is proportional to the match between said input vector and said weight.

8. The synapse cell of claim 7 further comprising programming means for programming said weight into said floating gate devices.

9. The synapse cell of claim 8 wherein said input vector and said weight represent binary values such that said difference current corresponds to the exclusive-OR function of said vector and said weight.

10. The synapse cell according to claim 9 wherein said pair of output lines are coupled to the inputs of a neural amplifier.

11. The synapse cell of claim 7 wherein said current difference is proportional to analog multiplication of said input vector and said weight.

12. In a neural network, a synapse cell for generating an analog current related to the binary dot product of an input vector and a weight, said cell comprising:
   first and second input lines providing said input vector and its complement, respectively;
   a pair of output lines providing said analog current:
   a pair of floating gate devices each having their gates coupled to said first line, their drains coupled to alternate ones of said output lines, and their sources grounded;
   another pair of floating gate devices each having their gates coupled to said second input line, their drains coupled to alternate ones of said output lines and their sources grounded,
   each of said floating gate devices also having a floating gate for storing said weight such that said analog current difference is related to the match between said weight and said input vector.

13. The cell according to claim 12 further comprising programming means for programming said weight onto said floating gates.

14. The cell according to claim 13 wherein said pair of output lines is coupled to the inputs of a current summing neural amplifier.

* * * * *